United States Patent [19]

Puryear

[11] 4,189,108
[45] Feb. 19, 1980

[54] BAIL RETAINING WASHER FOR FISHING REEL

[75] Inventor: John W. Puryear, Tulsa, Okla.

[73] Assignee: Brunswick Corporation, Skokie, Ill.

[21] Appl. No.: 932,846

[22] Filed: Aug. 11, 1978

[51] Int. Cl.² ............................................. A01K 89/01
[52] U.S. Cl. .............................................. 242/84.2 G
[58] Field of Search ................ 242/84.21 R, 84.21 A, 242/84.2 G, 84.5 A, 84.51 A

[56] References Cited

U.S. PATENT DOCUMENTS

4,095,756  6/1978  Morishita .................... 242/84.2 G

*Primary Examiner*—Billy S. Taylor
*Attorney, Agent, or Firm*—John G. Heimovics

[57] ABSTRACT

This invention comprehends a conventional style or skirted style spinning reel wherein the bail is connected to rotatable arms. The arms need to rotate from a casting position to a retrieving position. A means of accomplishing this rotation yet keeping the bail from coming loose from the reel is accomplished by using a unique retainer ring.

2 Claims, 11 Drawing Figures

BAIL RETAINING WASHER FOR FISHING REEL

BACKGROUND OF THE INVENTION

1. Field of the Invention

This invention relates to conventional style and skirted fishing reels, and more particularly, to a device that enables the bail arms to be secured to the fishing reel and yet rotate freely.

2. Background of the Prior Art

It is well known in the prior art that the bail arms on conventional spinning reels and skirted style fishing reels must rotate from the casting position to a retrieving position freely without becoming detached from the fishing reel. However, hitherto means of attaching the fishing reel have tried to utilize lock screws for which there is little room or just screws threaded in the holes hopefully keeping the bail arm tight. These means have not been too successful even though the use of spinning reels is quite large. However, a structurally sound system for connecting the bail arms of the bails so that they will not come loose has yet to be solved by the prior art.

SUMMARY OF THE INVENTION

This invention relates to conventional style spin fishing reels or skirted spin fishing reels which incorporates a bail that is movable from a casting to a retrieving position. The bail is secured to the rotor of the fishing reel by means of bail arms which are screwed in place.

It is therefore an object of this invention to provide a new and unique retainer ring utilized in securing the bail arms to the fishing reel rotor.

It is another object of this invention to provide an undercut portion in the bail arms so that the retainer may be tightly clamped to the rotor thus permitting the bail to freely rotate yet maintaining the retainers in position.

Yet another object of this invention is the provision whereby the bottom of the retainer is serrated.

Yet another object of the invention is the provision for the top of the retainer to be frusto-conical thereby conforming to the exterior shape of the bail arm.

The above and other and further objects and features will be more readily understood by reference to the following detailed description and the accompanying drawings.

DESCRIPTION OF THE PREFERRED EMBODIMENTS

Figure 1:
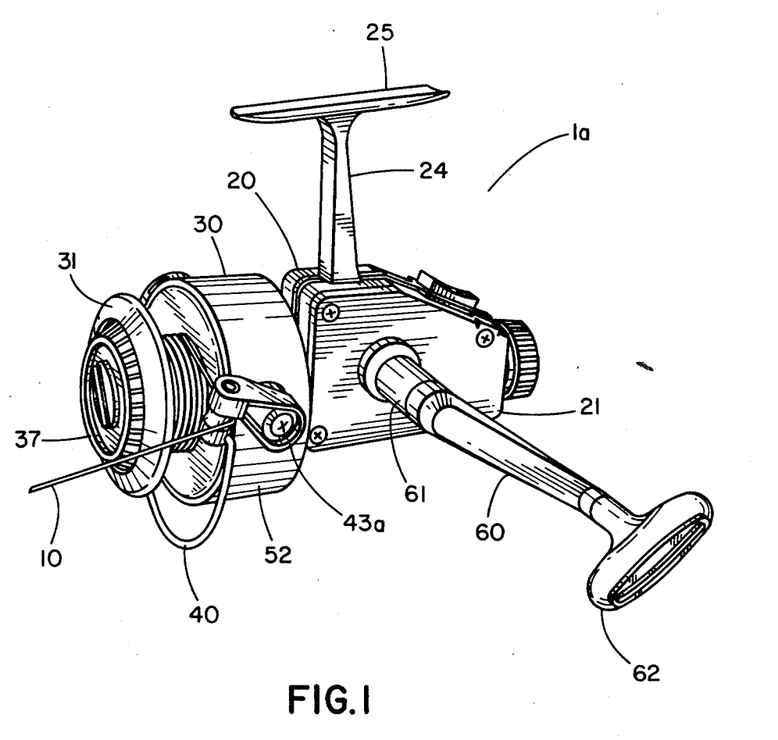
FIG. 1 is a perspective view of the conventional style spinning reel containing the invention described herein.
Figure 2:
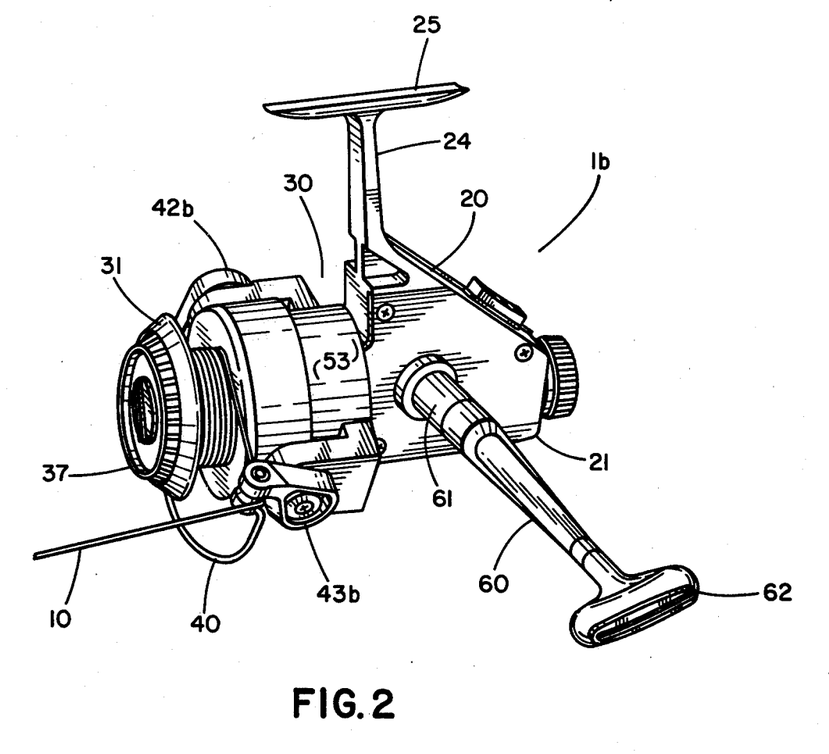
FIG. 2 is a perspective view of the skirted style spinning reel containing the invention described herein.

In FIG. 1, a conventional style open-face fishing reel 1a is shown and in FIG. 2 a skirted style open-face fishing reel 1b is shown. Both styles of reels function similarly, the only exception being the arrangement of the spool. As used hereinafter, the same numerals will designate the common parts for both reels; for special parts on the reels different numerical designations will be used.

The reel 1a or 1b having a housing 20 which includes an integral gear case 23, a stem 24 which connects the housing to a shoe 25. The shoe 25 is used to attach the reel to spinning style fishing rods. The reel includes a crank assembly 60, rotatable about a crank shaft hub 61 with a rotatable winding handle 62 for use by a fisherman with his left hand for line retrieval while the rod (not shown) is being held by the right hand as shown in FIGS. 1 and 2 only. As will be described hereinafter, the handle 60 may be disposed on the other side of the gear case 23 for accommodating the personal desires of the user.

An axially mounted rotor housing 30 is provided and adapted to rotate about the axis of the spool 31 as the crank 60 is turned for line retrieval, with the line 10 being captured by the bail 40 passing over the line guide assembly 41 as shown. Bail 40 and line guide 41 rotate with rotor 30 and the line 10 is thereby wound on the spool 31. The shank of the screws 32 and 33 function as rotary pivot bearing points and are accordingly the centers of rotation for the bail 40 via the bail arms 42a, 42b, 43a and 43b. An internal mechanism causes the line spool 31 to reciprocate axially back and forth as the rotor 30 winds the line 10 about the spool 31; but as in spinning reels generally, the spool 31 does not rotate about its central core axis, except as controllably permitted by the adjustable free-floating drag mechanism 50. Such permitted rotation of the spool may occur during the line retrieval when a fish is on the other end of the line 10 fighting for its life while still in the water; and, thus the force of the drag friction is overcome by tension in the line. When the bail 40 is swung open from the line 10 to an open position for casting, the line 10 may freely pay out from the spool 31 over lip 99. In FIGS. 1, 2, 5 and 6, the bail 40 is shown in the "closed", "retrieve", or "rewind" position. The line guide roller 410 is preferably rotatable, that is, it is preferably a minature pulley to reduce the sliding friction which might otherwise cause line wear.

In paying out the line 10 over the lip 99 of the forward flange of the line spool 31 during casting, the fisherman using an open face spinning reel is obligated to use his finger to snub the line and arrest its pay out, since the normal line drag provisions are not operative unless the reel is in the rewind or line retrieval mode of operation.

In the overall arrangement of the reel a cover plate 21 is secured to the gear case 23 by screws 26. Inside the gear case 23 is a gear assembly 70 that is rotatable by rotating the handle 62 about the hub 61. Oscillator gear 73 is rotatably mounted on stub shaft 27 which may be part of the interior of the housing gear case 23 or secured separately thereto. Gear 73 has an inwardly projecting plug 74 that fits into groove 76 (shown in phantom in FIGS. 5 and 6) of oscillator slider 75. Rotation of the gear 73 causes the slider 75 to slide forward and backward. Crank shaft gear assembly 64 has a tubular center shaft 65 that is journal mounted in bearings 66 in gear case 23 (partly shown) and in cover plate 21. The shaft 65 has an internal right hand thread that mates with the right hand thread 67c of shaft 67 on one side and a left hand thread that mates with left hand thread 67d when the shaft is placed on the other side of the reel. This dual threaded system enables the reel to be cranked both from the right hand and the left hand. The open end of the shaft 65 (the end which the shaft 67 is not inserted) is closed off by inserting screw cap 6 exterior of the gear case 23.

Small gear 68 meshes with gear 73 as the handle 62 rotates the shaft 67 thus providing the back and forth sliding motion to slider 75. A pinion gear assembly 80 is forwardly rotatably journal mounted in bearing 2 that is mounted in the forward section 22 of the housing 20 and secured there by bearing retainer 3 which fits into groove 4. The assembly 80 has a forward shaft 81 with oppositely spaced flats 82 thereon, a central bore 83, a forward threaded portion 84, a rearwardly projecting bearing stud 85 and a gear 86. The bearing stud 85 fits into bearing mount 28 which is part of housing 20. Thus, the pinion assembly 80 has two-point bearing support. The larger gear 69 engages pinion gear 86 causing it to rotate.

The center shaft 11 has back square portion 12, undercut grooves 13, front pin 14 which press fit into the shaft 11 and a front threaded portion 15, the shaft 11 slip fits into the pinion bore 83 and is supported thereby. The shaft 11 also fits through the hole 77 in slider 75. Special clip 16 fits around the hole 77 and slides into grooves 13 locking the shaft 11 to the slider 75. Thus, when the slider 75 oscillates back and forth the shaft 11 also moves back and forth with respect to the forward section 22 of the housing 20.

The rotor 30 is mounted on the forward portion 81 of assembly 80. The hole 34 with flats 34c is sufficiently large to pass over the pin 14 and then tighten on the forward threaded portion 84 by the use of tang 35 and nut 36; the respective flats 82 and 34c operable with each other. The spool 31 fits over the shaft 11 with the spool retainer knob 37 that is retained near the lip 99 having an internal threaded portion 39 that tightens down on thread 15. Thus, as the handle 62 turns the crank shaft 67, the gear assembly 64 causes the pinion assembly 80 to rotate which in turn causes the rotor 30 to rotate. At the same time rotation of gear 73 causes the slider 75 to reciprocate back and forth which causes the shaft 11 to move back and forth, so that line 10 can be wound during the retrieve mode in an orderly and uniform fashion on spool 31.

Contrary to standard spinning reels that have their drag associated with the front spool or locked into the back portion of the housing, the drag mechanism 50 is free-floating (it is self-contained as a unit and not captured in the housing).

Figure 3:
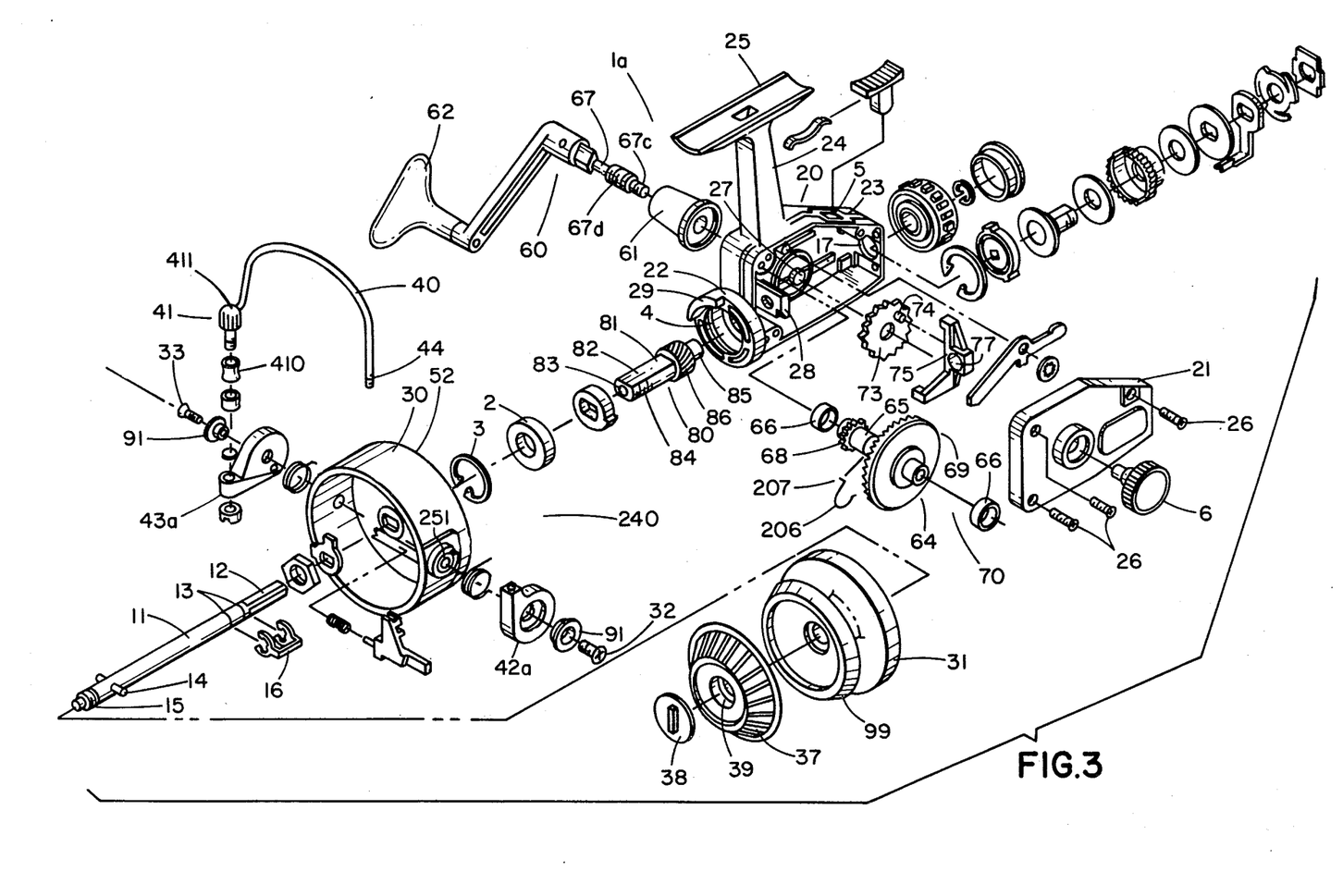
FIG. 3 is an exploded perspective view of the conventional style spinning reel containing the invention described herein.
Figure 4:
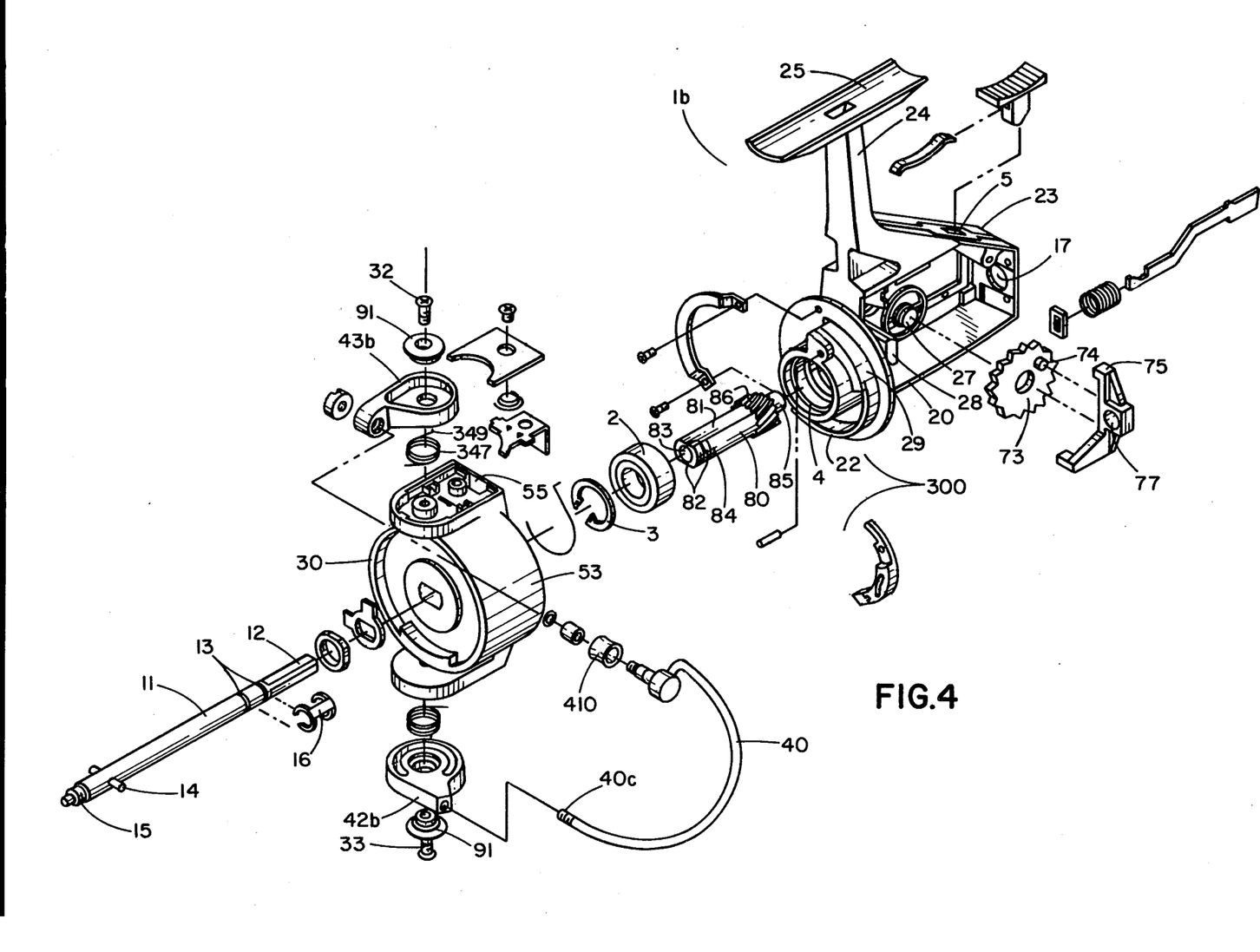
FIG. 4 is an exploded perspective view of the skirted style spinning reel not depicting some of the parts in common with the conventional reel shown in FIG. 3 but capable of incorporating the invention described herein.
Figure 5:
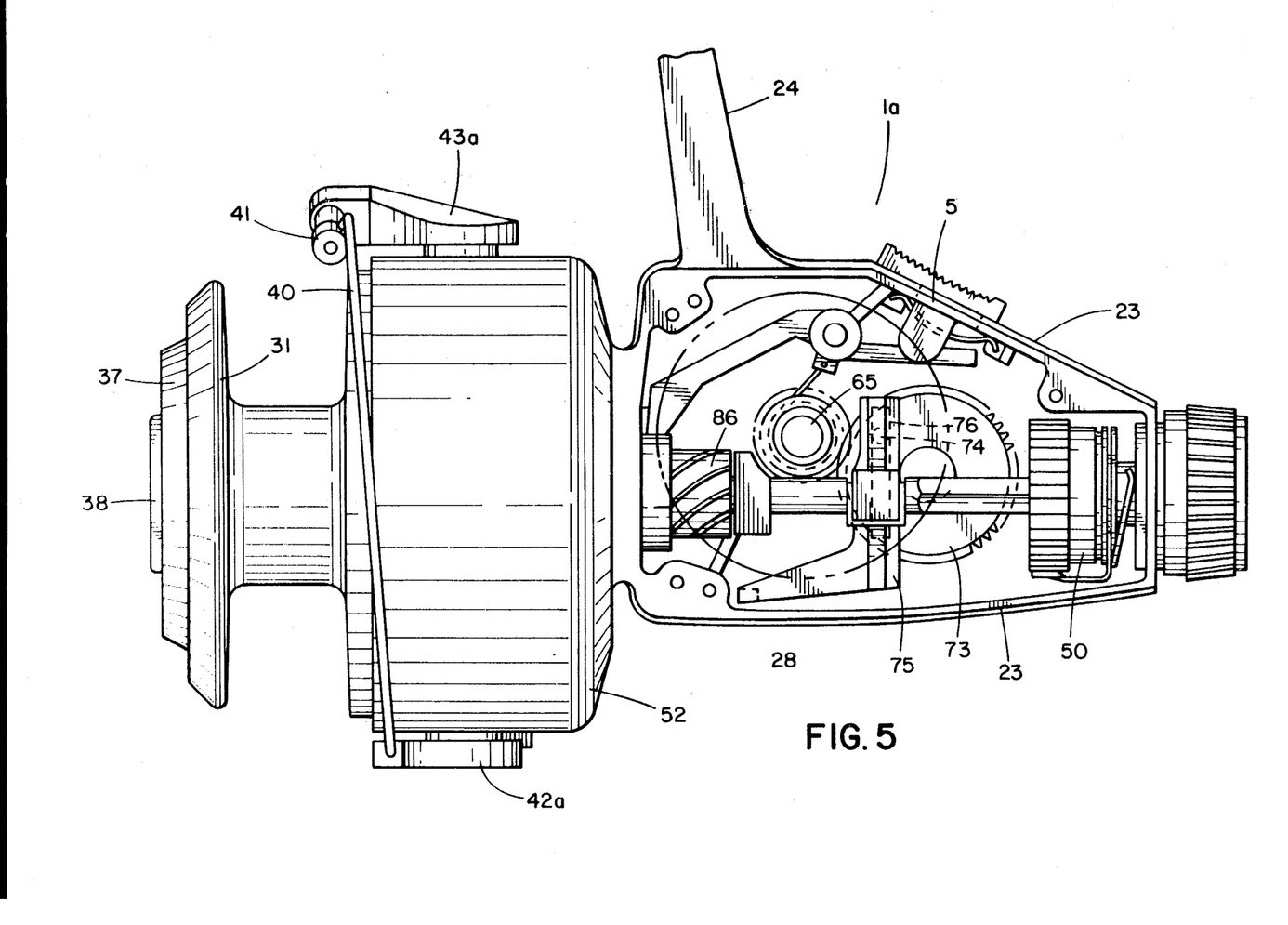
FIG. 5 is a cutaway side view of the conventional style spinning reel depicting the relative location of some of the parts of the reel.
Figure 6:
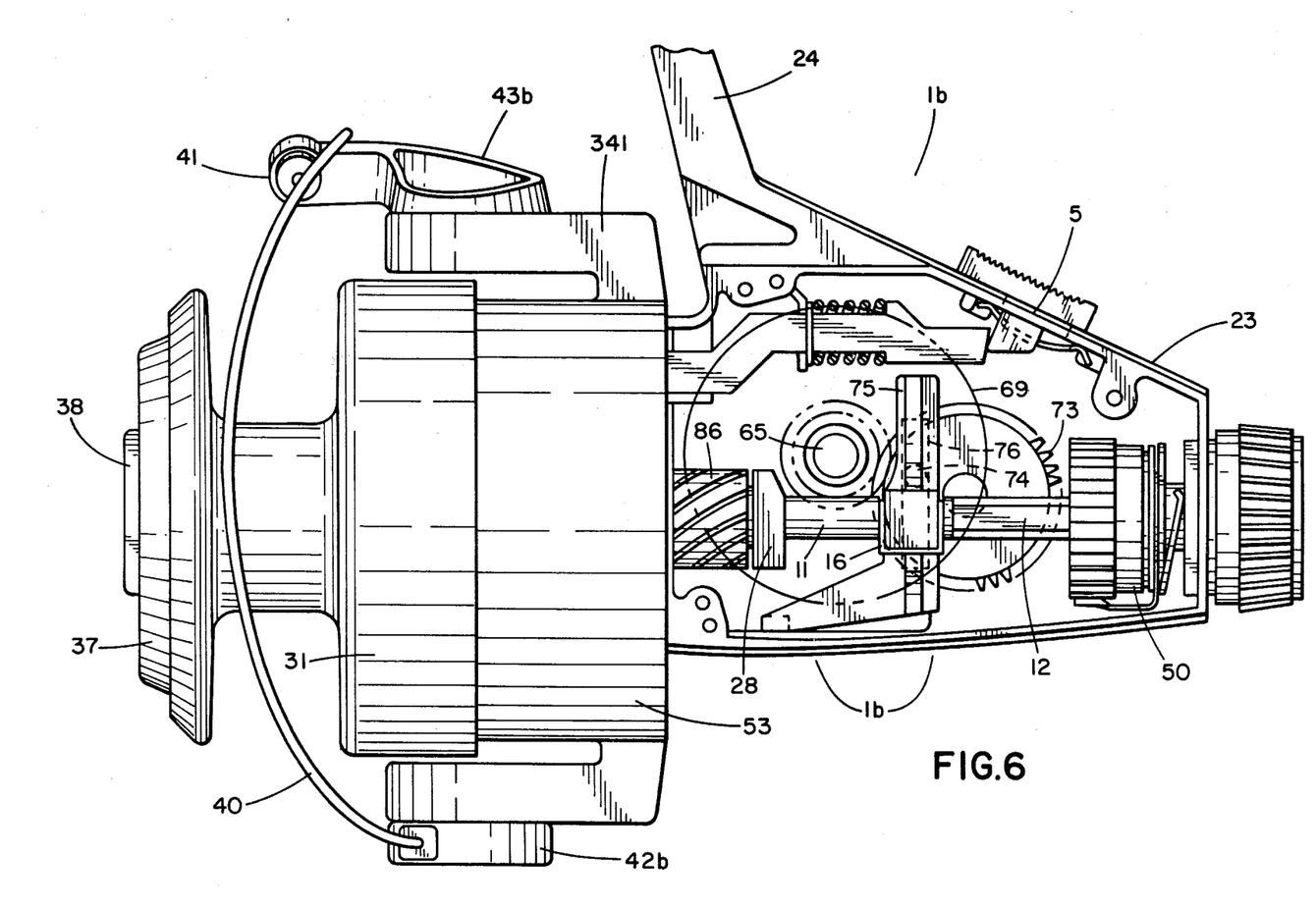
FIG. 6 is a cutaway side view of the skirted style spinning reel depicting the relative location of some of the parts of the reel.

A unique feature of reels 1a and 1b is the combined anti-reverse and self-centering bail feature that optionally can be used. In all spinning reels there is one best position in which to open the bail for casting, this is normally when the bail arms 42a, 42b, 43a and 43b are in generally vertical alignment with stem 24. Concomitantly, all reels need a device that prevents the rotor from rotating backward or in the counterclockwise direction when the reel is viewed from the face or the spool 31. In the conventional reel 1a shown in FIGS. 1, 3 and 5, self-centering mechanism 200 is depicted and in the skirted reel 1b as shown in FIGS. 2, 4 and 6, the self-centering mechanism 300 is depicted.

Not only is the anti-reverse and self-centering of the bail necessary, an automatic mechanism that causes the bail to move from the casting position to the retrieve position by just a turn of the handle 62 is also required. In the conventional reel 1a, shown in FIG. 3, the automatic internal bail trip mechanism 240 is shown in an exploded view. Most of the mechanism is contained in the rotor cup 52 and cooperates with cam 29 on the face 22 of the housing 20. In the skirted reel 1b, shown in FIG. 4, the major portion of the unique (unique because most skirted reels have external bail trip mechanisms) internal bail trip mechanism 340 is contained in ear 341 on the rotor 53 and cooperates with the cam surface 29 on the front of the housing 20.

Figures 7, 8, 9, 10, 11:
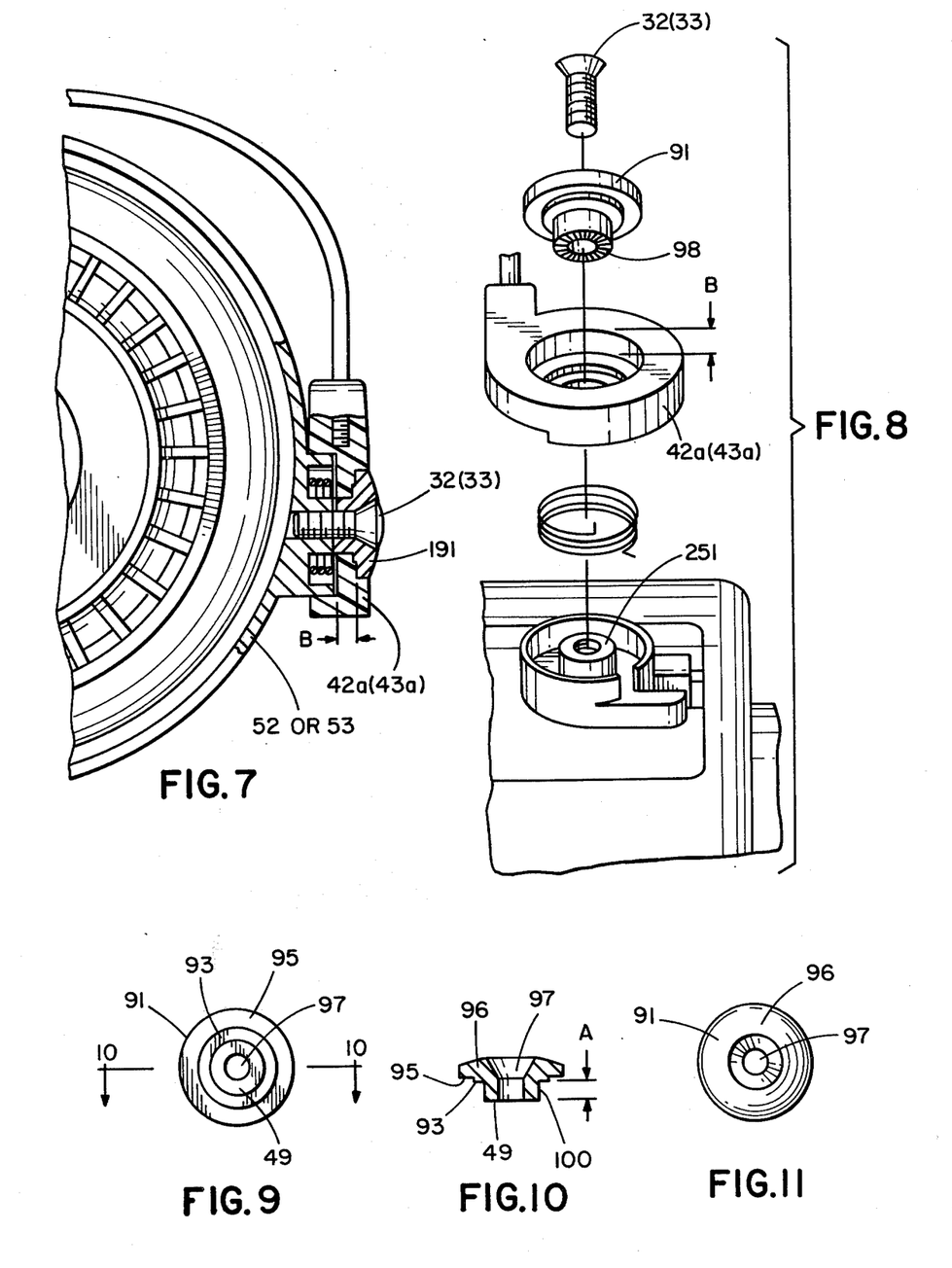
FIG. 7 is a partial cutaway view of one embodiment of the invention.
FIG. 8 is an exploded view containing the embodiment of the invention.
FIG. 9 is a bottom view of the retainer embodiment of the invention.
FIG. 10 is a cross-sectional view of FIG. 9.
FIG. 11 is a top view of the retainer embodiment of the invention.

In a preferred embodiment of the invention shown in FIGS. 8, 9, 10, 11 and 12, the bail arms 42a, 42b, 43a or 43b are secured to the rotor 52 or 53 by means of screws 32 or 33. Each one of the bail arms 42a, 42b, 43a or 43b have an undercut portion and a hole that accommodates retainer 91 as shown in FIGS. 8 and 9. The retainer 91 has a central hole 97 for screw 32 or 33, a frusto-conical top 96, a flat integral washer 93 and a flat underside washer 95 and a short cylinder 100. The depth of the bail arm recess "B" is less than the distance "A" on the retainer 91 which is measured from the underside of the small washer 93 to the bottom 49 of cylinder 100. Thus, when the screw 32 or 33 and the retainer 91 are tightened into the rotor 52 or 53, a very tight clamping force may be achieved yet permitting the bail arm 42a, 42b, 43a or 43b to freely rotate since the dimension "A" is greater than the dimension "B".

In an alternative embodiment of the invention in order to prevent the retainer from loosening at all, serrations 98 as seen in FIG. 9 are placed on the bottom of the retainer 91. When these serrations meet the top of the threaded stud such as 251, they lock tightly thereto thus eliminating any rotation or loosening between the screw 32 or 33, the retainer 91 and the rotor stud 251.

Although specific embodiments of the invention have been described, many modifications and changes may be made in the fishing reel without departing from the spirit and scope of the invention as defined in the appended claims.

What is claimed is:

1. In an open face fishing reel having a bail mounted on a rotor cup by means of at least one bail arm, each arm having a passage therethrough so that it may individually be secured to the rotor cup by means of screws, the improvement comprising a retainer washer having three integral cylindrical cylinders, the cylinders comprising a first small diameter cylinder, a second mid-size diameter cylinder adjacent to and contiguous with the first cylinder and a third large diameter cylinder adjacent to and contiguous with the second cylinder, the washer and each cylinder having one central passageway therethrough, the outer base surface of the third cylinder having a frusto-conical shape, and the outer base surface of the first cylinder defining a bottom surface; the retainer cooperatively mounted in the bail arm passage, the combined height of the first and second cylinders being greater than the height of the cooperative portion of the bail arm passage, the bottom surface adapted to come into direct contact with the rotor;

screw means mounted in the retainer passage fastening the retainer and bail arm to the cup, when the screw means is securely tightened into the cup, the greater height of the first and second retainer cylinders permits the bail arm to rotate freely.

2. The reel of claim 1 wherein the bottom surface is a serrated surface.

* * * * *